United States Patent [19]

Takahashi et al.

[11] Patent Number: 5,187,734
[45] Date of Patent: Feb. 16, 1993

[54] TELEPHONE MESSAGE RECORDING DEVICE

[75] Inventors: Tokihiro Takahashi; Takayuki Sato; Masuo Ota; Tatsuro Nagao, all of Saitama, Japan

[73] Assignee: Pioneer Electronic Corporation, Tokyo, Japan

[21] Appl. No.: 815,444

[22] Filed: May 2, 1989

Related U.S. Application Data

[63] Continuation of Ser. No. 900,858, Aug. 27, 1986, abandoned.

[30] Foreign Application Priority Data

Aug. 27, 1985 [JP] Japan .................. 60-187946
Oct. 25, 1985 [JP] Japan .................. 60-238970
Oct. 29, 1985 [JP] Japan .................. 60-242521

[51] Int. Cl.$^5$ ............................................. H04N 5/00
[52] U.S. Cl. ...................................... 379/79; 379/67; 379/70; 379/110; 358/85
[58] Field of Search ................. 379/53, 67, 70, 74, 379/79, 110; 358/22, 85, 181, 183

[56] References Cited

U.S. PATENT DOCUMENTS

| 4,338,492 | 7/1982 | Snopko | 379/110 |
| 4,356,509 | 10/1982 | Skerlos et al. | 358/85 |
| 4,392,022 | 7/1983 | Carlson | 379/110 |
| 4,427,847 | 1/1984 | Hofmann et al. | 379/110 |
| 4,456,925 | 6/1984 | Skerlos et al. | 379/110 |

Primary Examiner—Stuart S. Levy
Assistant Examiner—Joseph A. Rhoa
Attorney, Agent, or Firm—Sughrue, Mion, Zinn, Mackpeak & Seas

[57] ABSTRACT

A telephone answering attachment to a highfidelity music system. An adaptor switches audio signals between a telephone circuit, a double-deck recorder and an amplifier. A bell signal on the telephone circuit causes one deck to play a back a prerecorded message onto the telephone circuit and causes the other deck to then record the caller's message. A short notification message is displayed on a television screen. Otherwise, the adaptor leaves the double-deck recorder in its usual configuration.

2 Claims, 9 Drawing Sheets

TELEPHONE MESSAGE RECORDING DEVICE

This is a continuation of application Ser. No. 06/900,858, filed Aug. 27, 1986, now abandoned.

BACKGROUND OF THE INVENTION

1. Field of the Invention

This invention relates to a telephone message recording system. In particular, it relates to one capable of functioning as an automatic telephone message recorder in addition to functioning as a conventional audio system. The total system includes a magnetic playback device known as a double-deck tape recorder consisting of a playback mechanism and a recording mechanism in combination with an adaptor (telephone adaptor) connected to the tape recorder.

2. Background Art

Figure 1:
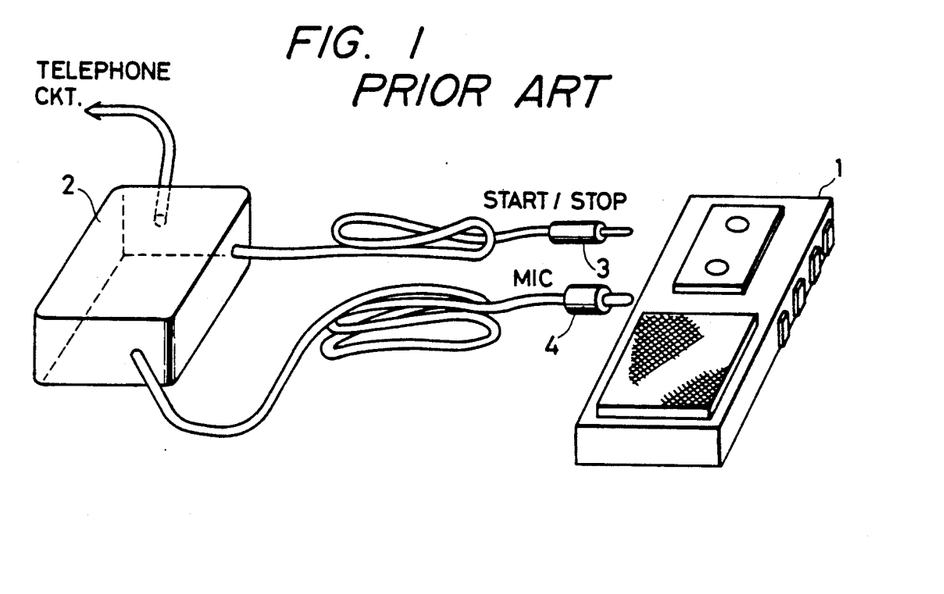
FIG. 1 is a block diagram of a conventional audio signal playback device.

Heretofore, automatic telephone message recording has been effected by coupling an adaptor to a tape recorder as shown in FIG. 1. FIG. 1 shows a portable tape recorder 1 designed to record an audio signal on a magnetic tape contained in a cassette or microcassette for subsequent playback. The tape recorder 1 is combined with an adaptor for connecting the tape recorder 1 to a telephone circuit and control and audio cables 3 and 4, for transmitting control and audio signals.

On receiving a calling signal from the telephone circuit, the adaptor 2 detects the signal and sends a voice synthesizing message, that has been prestored in a built-in solid-state memory, to the telephone circuit. The adaptor 2 short-circuits the control cable 3 after sending out the message. Consequently, a start signal is applied to the start/stop terminal of the tape recorder 1, which was preset to the recording mode, and the tape recorder 1 starts recording by activating the built-in cassette tape. The caller's message transmitted through the telephone circuit is supplied to the microphone terminal of the tape recorder through the audio cable 4 and is recorded on the magnetic tape. The adaptor 2 opens the telephone circuit after a predetermined interval of time subsequent to the detection of the calling signal and also removes the short-circuit from the cable 3. As a consequence, a stop signal is applied to the start/stop terminal, whereby the tape recorder 1 stops the transport of the magnetic tape and is then kept on standby.

Since the conventional telephone message recorder employs a simple portable tape recorder 1 containing a speaker, an amplifier and the like as well as one cassette, the control signal produced by the adaptor 2 is simply intended to start or stop the operation of the recorder. However, most recently developed high-fidelity (HF) audio cassette tape recorders are of the so-called double-deck type including, in combination, a deck at least capable of playback of one tape and another deck at least capable of recording on another tape so that a playback signal from one of the cassettes can be copied onto the other. These double-deck recorders also contain versatile functions including playback by means of a timer in not only the forward direction but also the reverse direction. When the combination of such a double-deck high-fidelity audio tape recorder and an adaptor is used to realize the telephone message recording function, the double-deck recorder must be modified to a large extent in order to prevent malfunction or misoperation. The disadvantage is that such modification makes the recorder complicated on one hand and increases production costs on the other.

In case the listener is seated in a large room and is separated far from the place where the telephone is installed, external noise or the music sound volume may make the user fail to notice an incoming call. In that case, the above automatic telephone message recording system functions as a mere telephone message recorder and is unable to deal with the situation properly.

Another problem is that undesirable trouble, such as the closure of the telephone circuit, readily occurs on arrival of a calling signal because the adaptor 2 is unable to detect malfunctions arising in the tape recorder 1.

SUMMARY OF THE INVENTION

An object of the present invention is to provide a telephone message recording system which functions as a telephone message recorder solely by a combination of a double-deck recorder as one of the component parts of an audio system. A telephone adaptor is connected to the double-deck recorder and is designed to notify the user of an incoming call without his needing to move by displaying predetermined characters on a television receiver or by producing a predetermined sound (including attenuating or cutting off the sound volume). This notification is accomplished by using a bell signal detecting output from the telephone circuit.

BRIEF DESCRIPTION OF THE DRAWINGS

FIG. 4 is an overview of a timing chart showing the operation of the preferred embodiment of the present invention, wherein FIGS. 4A and 4B show the actual timings.

DETAILED DESCRIPTION OF THE PREFERRED EMBODIMENTS

Figure 2:
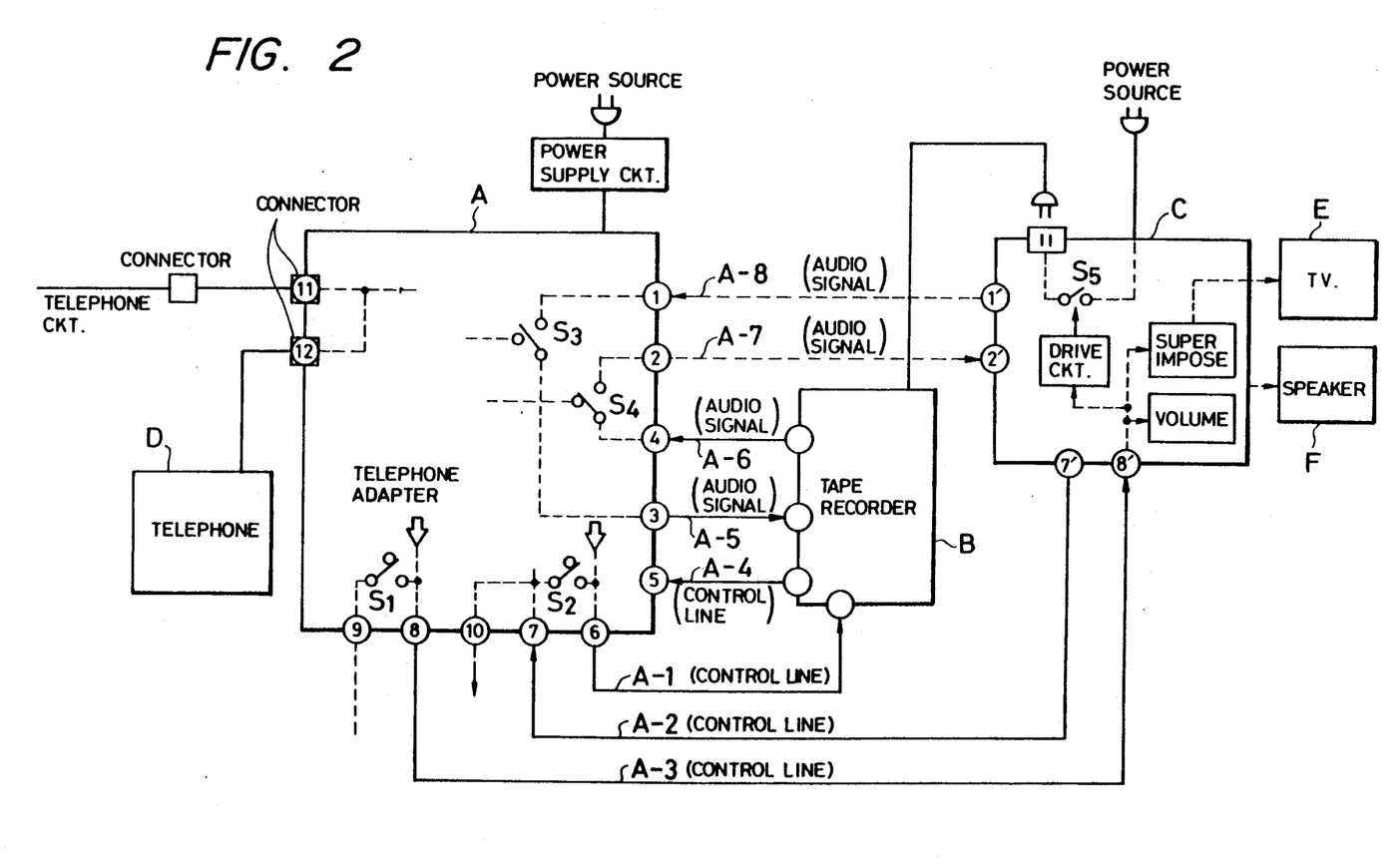
FIG. 2 is a block diagram of a telephone message recording system embodying the present invention and shows the flow of signals in the telephone message recording mode.
Figure 3:
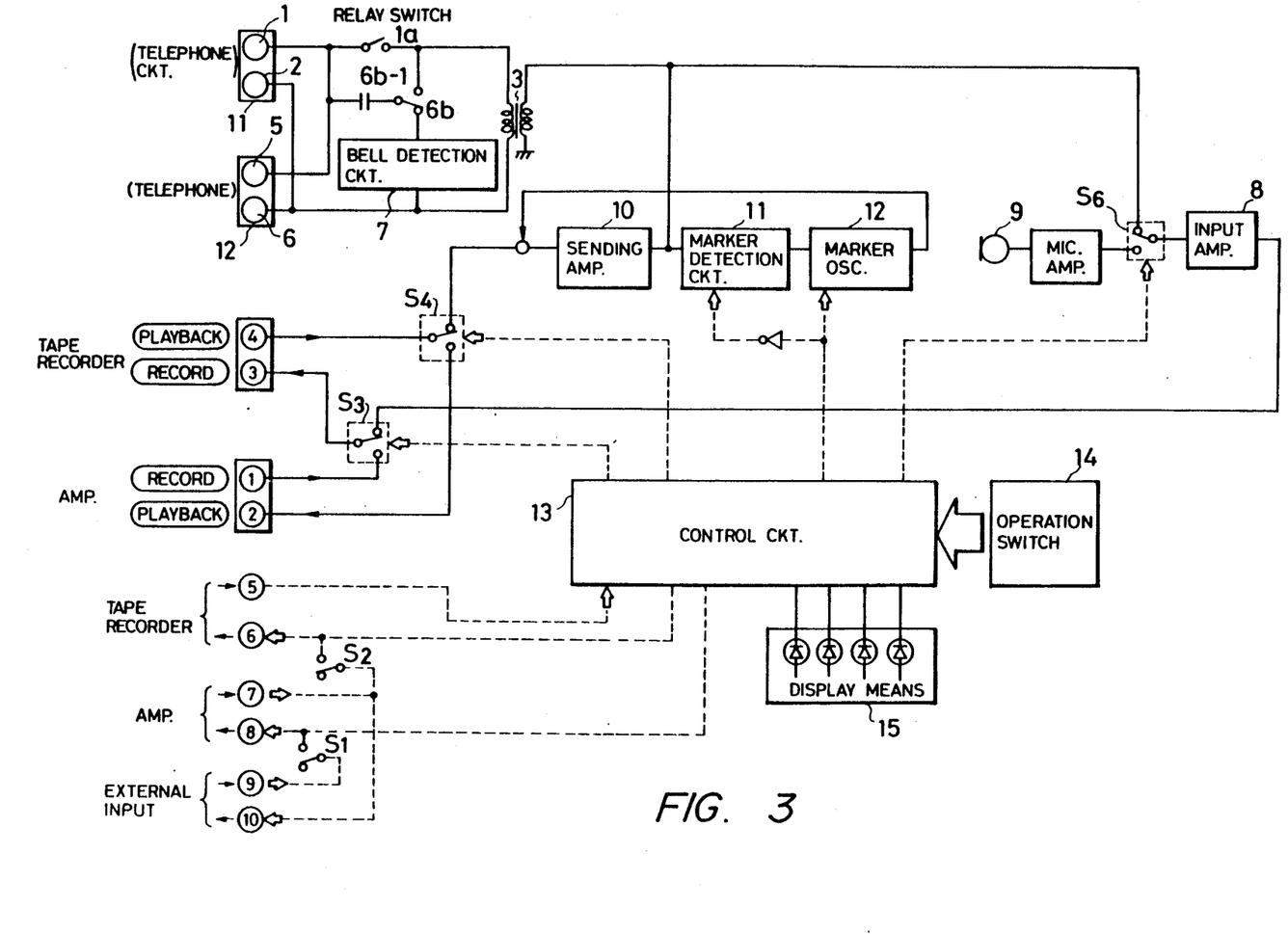
FIG. 3 is a block diagram of a telephone adaptor embodying the present invention.

Referring to the accompanying drawings, an embodiment of the present invention will be described. FIG. 2 is a block diagram of a telephone message recording system showing the flow of signals in a telephone message recording mode. FIG. 3 is a block diagram showing the circuitry of a telephone adaptor A and the flow of the signals in the telephone message recording mode.

In FIG. 2 are shown the telephone adaptor A and a tape recorder B. The tape recorder B is equipped with a first mechanism (tape deck) having at least a play-back function and a second mechanism having at least a recording function. The telephone message recording system also includes an amplifier C, a telephone D, a television E and a speaker F.

The telephone adaptor A is directly connected to the telephone D through a connector 12 and to a telephone circuit through a connector 11.

When the telephone adaptor A receives a bell signal from the telephone circuit, a bell signal detection output is applied to a control circuit 13 (FIG. 3) and the output of the control circuit 13 is applied to the amplifier C through a terminal 8 and a control line A-3 (FIG. 2). The terminal 8 is connected to an external input terminal 9 connectable to a personal computer or the like through a switch S₁, which switches an audio system control signal. The signal received from a terminal 8' on the amplifier C indirectly drives an AC outlet relay switch S₅ so that the tape recorder B is supplied with power. The output signal from an output terminal 7' on the amplifier C is supplied to the input terminal 7 of the telephone adaptor A through control line A-2. The input terminal 7 is internally connected to an external output terminal 10 and also to an output terminal 6 through a switch S₂ which is switched by an audio system control signal. The output signal from the control signal output terminal 6 is applied to the tape recorder B through a control line A-1 and is used to control the various operations of the tape recorder B. Moreover, the control signal directed from the tape recorder B to the telephone adapter A is supplied to an input terminal 5 through a control line A-4.

The audio signal from the tape recorder B is supplied to an input terminal 4 through an audio line A-6, and from there through a switch S₄ to an output terminal 2 and to the input terminal 2' of the amplifier C through audio line A-7. In the other direction, the audio signal from the output terminal 1' of the amplifier C is supplied to the input terminal 1 of the telephone adaptor A through audio line A-8, and from there through a switch S₃ to an output terminal 3 and to the tape recorder through a control line A-5. Both the switches S₃ and S₄ are switched by audio system control signals.

Figures 4, 4B:
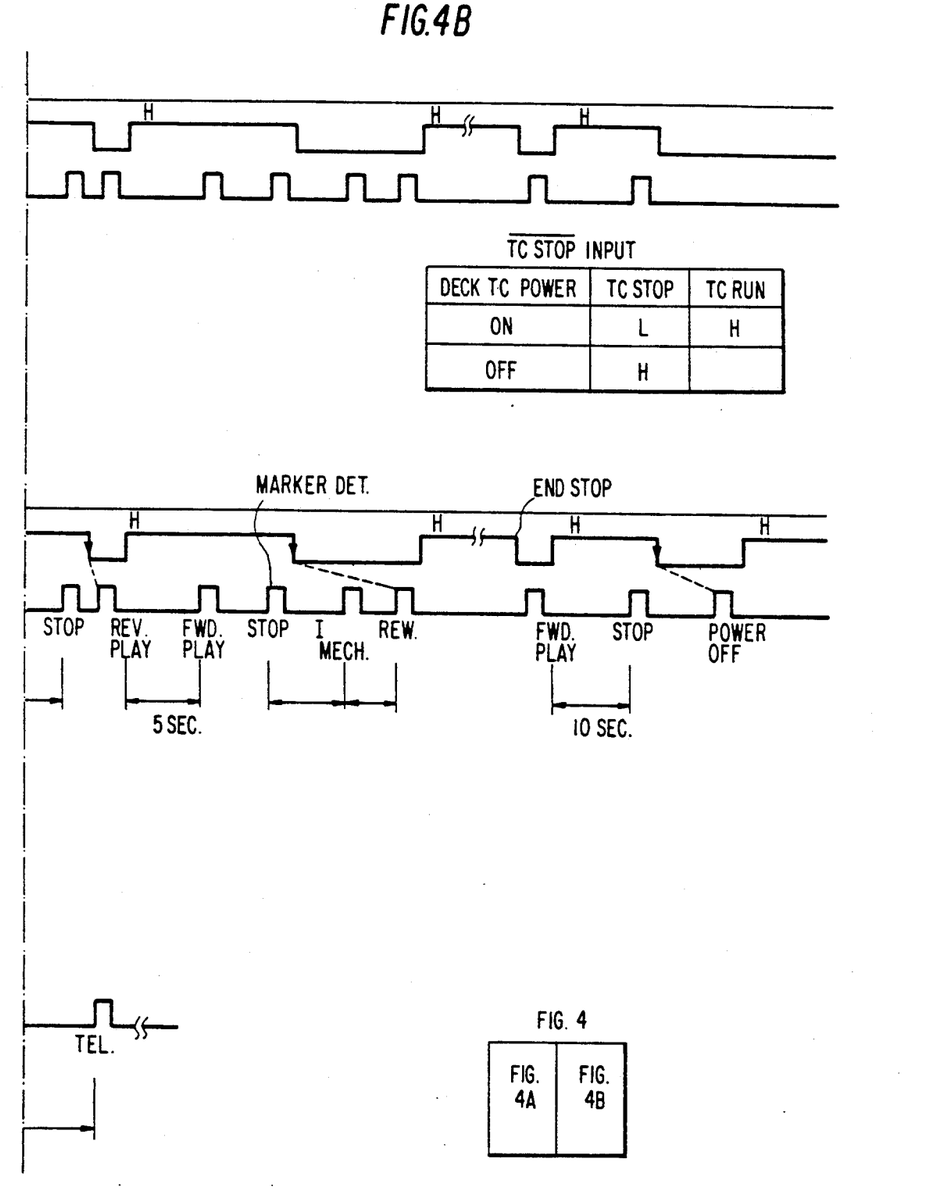
Figure 4A:
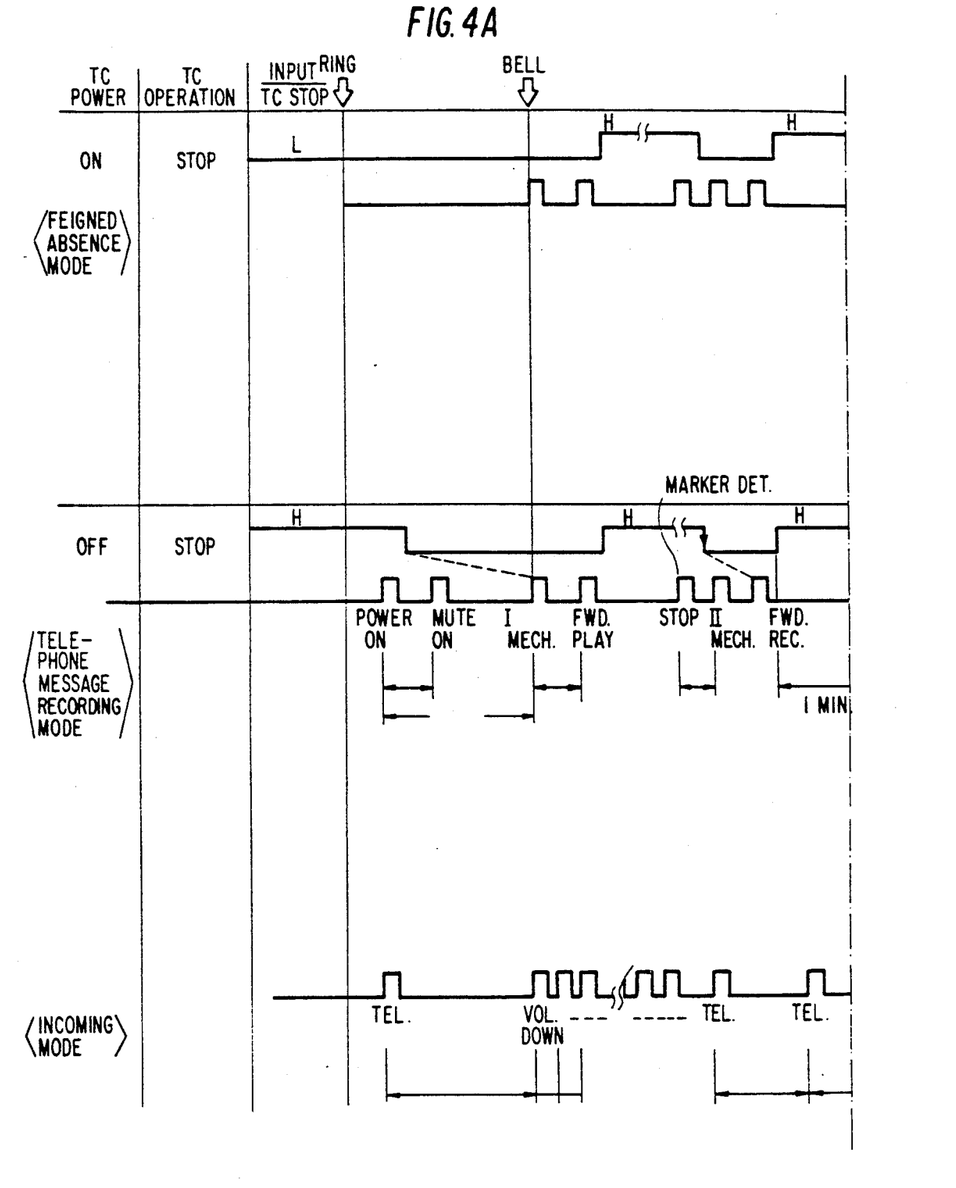

A description will now be given of FIG. 3 showing the telephone adaptor A in detail, wherein like reference characters designate like elements of FIG. 2. Timing diagrams for several of the modes are shown in FIG. 4.

An operation switch 14 shown in FIG. 3 is equipped with mode selection buttons for selecting an incoming mode for notifying the reception of a bell signal from the telephone circuit, a telephone message recording mode for effecting telephone message recording operations., a speech mode, etc.

FIG. 3 also shows the flow of signals in the telephone message recording mode. The switches S₁-S₄ for switching the audio system control signal are set for the telephone message recording mode.

One end 1 of a communication connector 11 is connected to the other end thereof through a relay switch 1a and the primary coil of a transformer 3. A bell detection circuit 7 is connected to the one end 1 of the communication connector 11 through a relay switch 6b. A switching terminal 6b-1 of the relay switch 6b is connected to a line connecting the other end 5 of the telephone connector 12 with the input terminal of the relay switch 1a, whereas the other end of the communication connector 11 is connected to the terminal 6 of the telephone connector 12.

The secondary coil of the transformer 3 has one end grounded and the other end connected to a switch S₆, which is used to switch a system signal to either a built-in microphone 9 or to the telephone circuit.

The signal of the switch S₆ is amplified by an input amplifier 8 and applied to the recording terminal 3 of the tape recorder by the switch S₃, switched by an audio system control signal.

The playback signal of the tape recorder is supplied to a sending amplifier 10 and a marker detection circuit 11 through the switch S₄, which is switched by an audio system control signal.

Moreover, each switch and each circuit is controlled by a control circuit 13 formed with a microcomputer and the like.

(a) Telephone message recording operation

The timing diagram for the telephone message recording mode is shown in the middle trace of FIG. 4.

Arrival of bell signal—amplifier muting on

While the telephone adaptor A is in the telephone message recording mode, it supplies a "power on" instruction signal to the amplifier C through the control line A-3 upon receiving the bell signal from the telephone circuit through the communication connector 11. On receiving this signal, the amplifier C turns on the AC outlet relay switch S₄ and thus supplies AC power to the double-deck recorder B. On receiving the AC power, the double-deck recorder B (its line switch being kept on) remains on standby for an initially fixed set time interval. On the other hand, the telephone adaptor supplies a "mute" instruction signal through the control line A-3 a fixed time interval later than the application of the "power on instruction" signal. On receiving the "mute" instruction signal, the amplifier brings the muting process into effect to prevent the now undesired sound derived from the previously set input source from being generated by the speaker.

First mechanism designation—message sending

The telephone adaptor supplies a "first mechanism designation" instruction signal to the double-deck recorder B through the control line A-1. This signal contains instructions directed to the deck having a playback function. On receiving the signal, the double-deck recorder B switches to the first mechanism operation mode and remains on standby in preparation for receiving the input on the first mechanism deck (for replaying the message tape). The telephone adaptor A further applies a "forward play" (FWD PLAY) instruction signal to the double-deck recorder B through the control line A-1. On receiving the signal, the double-deck recorder B sets the first mechanism to the FWD PLAY mode and starts playing back an answerback message. On the other hand, the telephone adaptor A turns on the relay switch 1a on the telephone circuit to form an AC loop. This allows the reception of a call in response to the bell signal. Simultaneously, the telephone adaptor A turns on a circuit for sending the answer-back message in the form of a voice reproduced by the double-deck recorder to the telephone circuit through the switch S₄.

Marker detection—remark recording

After the answer-back message prestored on the message tape is sent out, the marker signal tone following the answer-back message is reproduced and sent out. The marker signal tone is sent to the telephone circuit. Also, the telephone adaptor A detects the marker signal tone and starts the subsequent operation. In other words, the telephone adaptor A applies a "stop" instruction signal to the double-deck recorder B through the control line A-1. On receiving the signal, the double-deck recorder B stops the first mechanism deck and stops the message tape from being replayed. The telephone adaptor A further successively supplies a "second designation" instruction signal (directed to the deck having a recording function) and a "forward recording" (FWD REC) instruction signal to the double-deck recorder B through the control line A-1. On receiving these signals, the double-deck recorder B switches to the second mechanism operating mode and remains on standby in preparation for receiving the input on the second mechanism deck (for recording the call). The second mechanism is further set to the forward recording (FWD REC) mode so that a caller s remarks are recorded by the second mechanism deck.

Termination of remark recording—answer-back preparation

When a fixed period of time (about one minute) has elapsed after the call recording mode has been put into effect by the second mechanism deck, the telephone adaptor A supplies the "stop" instruction signal to the double-deck recorder B through the control line A-1. On receiving the signal, the double-deck recorder B sets the second mechanism deck to the stop mode (stops it) and stops recording the call.

The telephone adaptor A enters a preparatory mode for responding to the next bell signal after it has responded to the first call by sending an answer-back message using the first mechanism deck in response to the first bell signal supplied by the telephone circuit and by recording the caller's remark using the second mechanism. In other words, the telephone adaptor supplies the "first mechanism designation" instruction signal and a "rewinding" (REW) instruction signal to the double-deck recorder successively through the control line. On receiving these signals, the double-deck recorder B switches to the first mechanism operating mode and is put into the state for receiving the next call on the first mechanism deck (for replaying the answer-back message tape). The first mechanism deck is then set to the rewinding (REW) mode so that the answer-back tape is rewound.

Setting top end of message tape in position—standby

When the answer-back message tape is rewound completely, the double-deck recorder B automatically stops (END STOP).

In compliance with END STOP, the adaptor A applies the "forward play" (FWD PLAY) instruction signal to the double-deck recorder B through the control line A-1. On receiving the signal, the double-deck recorder B brings into effect the forward play (FWD PLAY) mode wherein the leading end of the answer-back message tape is set in position. After allowing forward play (FWD PLAY) for the fixed duration of travel, the telephone adaptor A applies the "stop" instruction signal to the double-deck recorder B through the control line A-1. On receiving the signal, the double-deck recorder B sets the first mechanism deck to the stop mode and completes the setting of the leading end of the answer-back message tape in position. On the other hand, the telephone adaptor A supplies a "power off" instruction signal to the amplifier C through the control line A-3. On receiving the signal, the amplifier turns off the AC outlet relay switch S₅ so that the supply of power to the double-deck recorder B is stopped. Moreover, the telephone adaptor turns off the relay switch 1a to release the DC circuit (cut the telephone) and stays on standby for the next bell signal.

Feigned absence mode

The timing diagram for the feigned absence mode is shown in the top trace of FIG. 4. Even though the telephone adaptor is in a feigned absence mode, the signal of the control line A-4 is set at the low level when the amplifier C is in the power-on mode while playback is performed and when the double-deck recorder B is in the stop mode. The amplifier C is always set at the high level at the time of power off. On receiving the bell signal from the telephone circuit, the telephone adaptor A never produces the above "mute on" instruction and the "power off" instruction signals. If a telephone call is received during playback, the telephone message recording function will be allowed to be carried out without affecting the playback.

(b) Incoming call confirmation

The timing diagram for this mode is given in the bottom trace of FIG. 4. On receiving the bell signal from the telephone circuit while in the incoming mode, the telephone adaptor A applies a "TEL" instruction signal to the amplifier C through the control line A-3. On receiving the signal, the amplifier C goes through a superimposing process intended for a video signal system and causes a memory in which are stored predetermined characters to be read and displayed on a television screen by means of the control signal. The superimposing process is effected for a fixed period of time and then terminated. The telephone adaptor A repeatedly supplies a "vol down" instruction signal to the amplifier more than once through the control line A-3. On receiving the signal, the amplifier controls a volume regulating circuit so as to lower the volume of playback sound produced by the speaker.

Although it has been arranged that the predetermined characters are displayed on the television screen according to this embodiment, a predetermined sound may, needless to say, be generated instead.

The tape recorder, the amplifier, television, etc. in this telephone message recording system may also be such that they can be remotely controlled.

(c) Speed mode operation

On receiving the bell signal from the telephone circuit while the telephone adaptor is in a speed mode, the position of the relay switch 6b changes to provide the speed mode. The relay switch 1a remains open at this time.

As set forth above, the telephone message recording system according to the present invention has the following effects:

(a) No special apparatus such as an automatic telephone answer-back apparatus other than the audio system is required to realize the function of a telephone message recorder.

(b) By connecting the telephone adaptor to the ordinary double-deck recorder, the ordinary audio system is simply allowed to function as a telephone message recorder.

(c) When an incoming call is made while the audio system functions, the predetermined characters are displayed on the television screen or the predetermined sound is generated and the sound volume of the music or the like is attenuated or cut off so that the incoming call can be confirmed.

(d) An incoming call can be confirmed instantly by attenuating or cutting off the audio signal output using the bell detection output even though the telephone is installed substantially apart from the user. Alternately, playback can be made at full volume.

Figure 5:
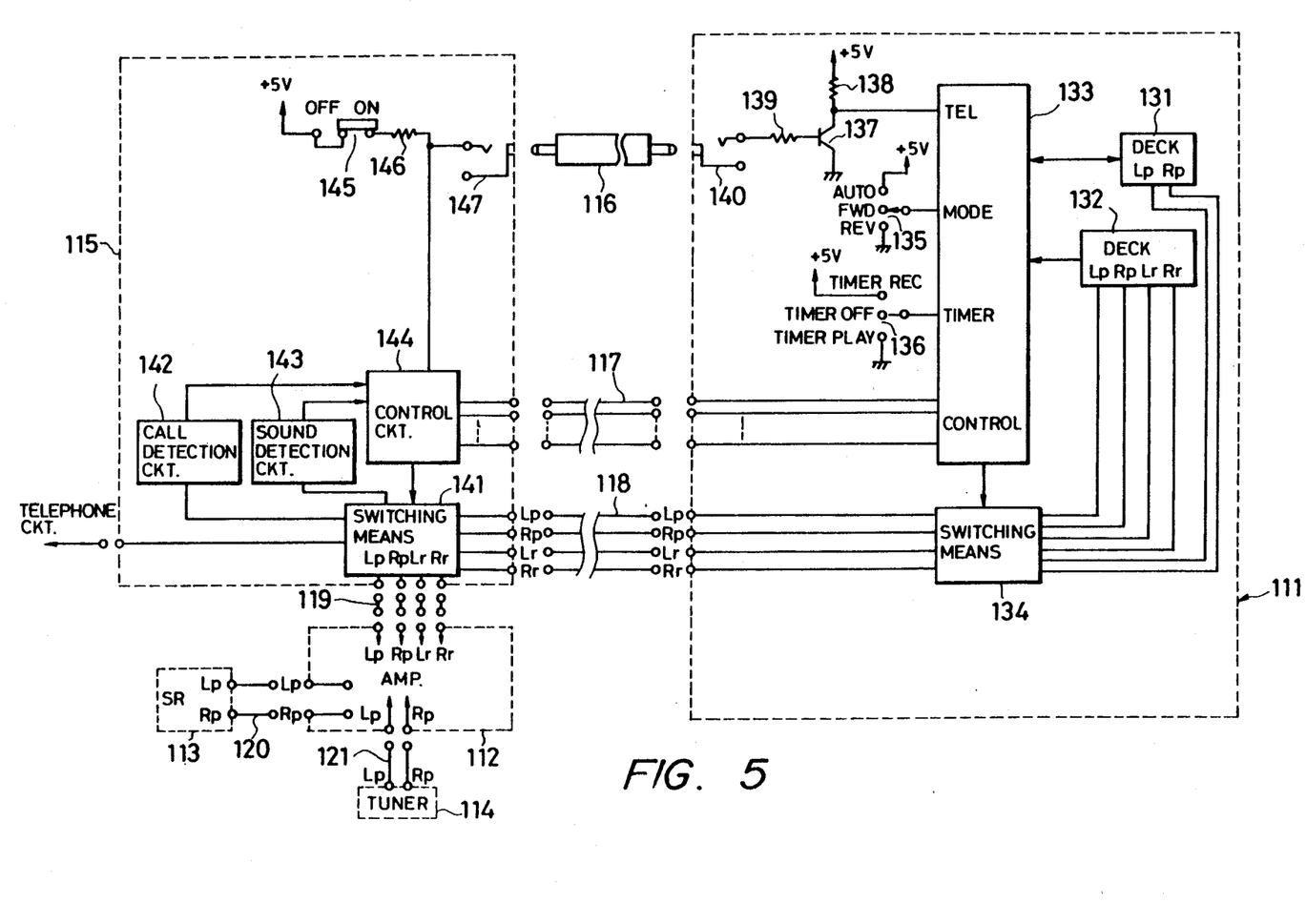
FIG. 5 is a block diagram of an audio signal playback device embodying the present invention.

FIG. 5 is a block diagram of an audio signal playback system embodying the present invention. In FIG. 5, an adaptor 115 is added, as occasion demands, to realize the telephone message recording function by means of the regular HF audio system. The regular HF audio system comprises a double-deck recorder 111, an amplifier 112, a speaker system 113, and a tuner 114 (a record player or a digital audio disk player can be substituted with the same effect). The double-deck recorder 111 and the adaptor 115 are connected together through a cable 116 for transmitting a control signal and through remote control cables 117. On the other hand, playback signal output terminals $L_p$ and $R_p$ of the adaptor 115 and recording signal input terminals $L_r$ and $R_r$ of the double-deck recorder 111 are connected together through audio signal cables 118 for transmitting an audio signal. The adaptor 115 and the amplifier 112 are connected together in that the playback signal output terminals $L_p$ and $R_p$ and the recording signal input terminals $L_r$ and $R_r$ of the left and right stereo signals are mutually connected through audio signal cables 119. The amplifier 112 and the speaker system 113 are connected together in that their play-back signal output terminals $L_p$ and $R_p$ are mutually connected. The amplifier 112 and the tuner 114 are mutually connected in that their playback signal output terminals $L_p$ and $R_p$ are connected together through audio signal cables 121.

The double-deck recorder 111 is equipped with a deck 131 capable of at least playback and another deck 132 capable of recording and playback. A double-deck control circuit 133 formed with a microcomputer or the like is used to control the decks 131 and 132 as well as a switching unit 134. The playback signal output terminals $L_p$ and $R_p$ of the playback deck 131 are connected to the switching unit 134. The playback signal output terminals $L_p$ and $R_p$ and the recording signal input terminals $L_r$ and $R_r$ of the recording and playback deck 132, and further the playback signal output terminals $L_p$ and $R_p$ and the recording signal input terminals $L_r$ and $R_r$ of the double-deck recorder 111 are also connected to the switching unit 134. A switch 135 is used for choosing the travel direction mode of the magnetic tape of the decks 131 and 132. A switch 136 is operated at the time of playback of deck 131 or 132 through a timer in the control circuit 133, or at the time of recording of deck 132 recording through the timer. The collector of an npn transistor 137 is connected to a predetermined reference voltage supply through a resistor 138, whereas the base is connected to a jack 140 through a resistor 139. A 2P plug of the cable 116 is connected to the jack 140 and completes the circuit to the resistor 139.

On the other hand, the adaptor 115 has a switching unit 141. The switching unit 141 is connected to the playback signal output terminals $L_p$ and $R_p$ and the recording signal input terminals $L_r$ and $R_r$ of both the double-deck recorder 111 and the amplifier 112 through audio signal cables 118 and 119. The switching unit 141 also connects the playback signal output terminals $L_p$ and $R_p$ or recording signal input terminals $L_r$ and $R_r$ of the double-deck recorder 111 to a telephone circuit connecting terminal L through the audio signal cable 118. A call detection circuit 142 detects a call signal from the telephone circuit. A sound detection circuit 143 detects either when a silent portion of the audio signal of the telephone circuit exceeds a fixed time or the presence the marker signal of a fixed frequency. A control circuit 144, such as a microcomputer, controls various circuits and electro-mechanical devices. A switch 145 is operated when the telephone message recording operation is to be performed. One end of the switch 145 is connected to the predetermined reference voltage supply and the other end is connected to a jack 147 and to the control circuit 144 through a resistor 146. A 2P plug at the end of the cable 116 is connected to the jack 147 to complete the circuit.

The operation of the telephone message recording system will now be described. When the HF audio system is operated normally, that is, not functioning as a telephone message recorder, the switch 145 of the adaptor 115 is turned off. Consequently, the transistor 137 of the double-deck recorder 111 is turned off and a high level signal is applied to the terminal TEL of the control circuit 133. At this time, the control circuit 133 controls the decks 131 and 132 and the switching unit 134 in conjunction with the operation of the switches 135 and 136. In other words, the transport of the magnetic tape on the deck 131 or 132 is switched toward the forward direction when the switch 135 is caused to contact the middle contact (FWD), allowing the mode terminal of the control circuit 133 to open and then to reverse direction when it is caused to contact the lower contact (REV), thus allowing the mode terminal to be grounded.

When the switch 135 is caused to contact the upper contact (AUTO), allowing the mode terminal to receive the predetermined reference voltage, the auto reverse operation is performed in which the travel direction is automatically reversed when a trailing end detector (not shown) detects the trailing end of the magnetic tape. On the other hand, the predetermined reference voltage is supplied to the timer terminal of the control circuit 133 when the switch 136 is caused to contact the upper contact (REC) and the timer recording operation is conducted by the deck 132. On the other hand, the timer terminal is grounded and the timer playback operation is performed by the deck 131 or 132 when the switch 136 is caused to contact the lower contact (PLAY). If a timer (not shown) is used to mark a fixed time interval, the recording or playback operation will be performed for a fixed period of time after the set time. When the switch 136 is caused to contact the middle contact (OFF), the timer terminal of the control circuit 133 is opened and the operation by means of the timer is inhibited.

When the copy operation is instructed, the switching unit 134 under the control of the double-deck control circuit 133 connects the playback signal output terminals $L_p$ and $R_p$ of the deck 131 to the recording signal input terminals $L_r$ and $R_r$ of the other deck 132 to have the playback signal from the magnetic tape of the deck 131 recorded on the magnetic tape of the deck 132.

When the switch 145 is kept off, the adaptor control circuit 144 controls the switching unit 141 so as to connect together the terminals corresponding to the audio signal cable 118 and 119. By selecting the function mode of the amplifier 112 for the appropriate deck, the playback signal of the deck 131 or 132 is applied to the amplifier 112 so that the amplified signal may be supplied to the speaker system 113. Moreover, by selecting the function of the amplifier 112 for the tuner and deck, the playback signal from the tuner 112 is supplied to the recording signal input terminals $L_r$ and $R_r$ of the deck 132 and recorded on the magnetic tape.

Subsequently, when the telephone message recording operation is performed, the switch 145 of the adaptor 115 is turned on. Then a high level signal is applied to the adaptor control circuit 144 through the resistor 146. The adaptor control circuit 144 controls the switching unit 141 at this time so as to connect the telephone circuit to the call detection circuit 142. Moreover, the adaptor control circuit 144 generates a control signal to the double-deck control circuit 133 through the remote control cable 117 and keeps the decks 131 and 132 on standby so that they can perform telephone message recording. At this time, only back-up power necessary for the double-deck control circuit 133 is supplied to the double-deck recorder 111, whereas the decks 131 and 132 are held off.

Although it is possible to provide a program for allowing the double-deck control circuit 133 of the double-deck recorder 111 to perform the telephone message recording, such an arrangement may become excessively expensive for the user who desires only the normal operation of the audio system without the adaptor 115. Accordingly, the basic control as a telephone message recorder should preferably be programmed using the control circuit 144 of the adaptor 115 so that the cost of the double-deck recorder can be reduced to that extent.

When a call signal from the telephone circuit arrives, the call detection circuit 142 detects the signal and applies a detection signal to the adaptor control circuit 144. The double-deck control circuit 133 turns on the power supply of the double-deck recorder 111 in response to the control signal from the adaptor control circuit 144 and causes the deck 131 to start playback operation. The double-deck control circuit 133 also controls the switching unit 134 and connects the playback signal output terminal $L_p$ and $R_p$ of the deck 132 to the playback signal output terminals $L_p$ and $R_p$ of the double-deck recorder 111. At the same time, the adaptor control circuit 144 controls the switching unit 141, causing the telephone circuit to close while connecting the playback signal output terminals $L_p$ and $R_p$ of the double-deck recorder 111 to the telephone circuit through the audio signal cables 118. In consequence, the answer-back message prestored on the magnetic tape of the deck 131 is sent out to the telephone circuit.

When the deck 131 detects the trailing end of the magnetic tape or when the voice detection circuit 143 detects that the answer-back message has terminated by detecting that the silent portion has continued in excess of the fixed period of time or by detecting the predetermined marker signal, the adaptor control circuit 144 applies the control signal to the double-deck control circuit 133, stops the playback of the deck 131, causes the magnetic tape to be rewound up to the starting position, and causes the deck 132 to start recording. The adaptor control circuit 144 controls the switching unit 141 at this time and connects the telephone circuit to the recording signal input terminals $L_r$ and $R_r$ of the deck 132 through the audio signal cables 118. The caller's message received through the telephone circuit is thus recorded on the magnetic tape of the deck 132.

When the voice detection circuit 143 detects that the silent portion has continued beyond the fixed period of time for the caller's message, the detection signal is applied to the adaptor control circuit 144. The adaptor control circuit 144 controls the switching unit 141 at this time, opens the telephone circuit, and connects the telephone circuit to the call detection circuit 142 for keeping the telephone circuit on standby. The double-deck control circuit 133 also controls the deck 132 so as to stop the recording operation and keep the deck 132 on standby.

When the switch 145 is operated (turned on), a high level control signal is supplied to the base of the transistor 137 through the resistor 146, the jack 147, the cable 116, the jack 140 and the resistor 139, and hence the transistor 137 is turned on. The terminal TEL of the double-deck control circuit 133 is subsequently grounded. The double-deck control circuit 133 sets the travel direction of the magnetic tape of the deck 132 to forward, irrespective of the position of the switch 135. At the same time, the timer recording or playback operation is inhibited, irrespective of the position of the switch 136. It is, of course, possible to operate the switches 135 and 136 with a different sequence.

When the telephone message recording operation is selected accordingly, the travel direction of the magnetic tape of the deck 132 is inhibited from being reversed, even if the tape is wound completely, so that the recording of the caller s message is prevented from being interrupted. If the switch 145 is operated by mistake to effect the telephone message recording operation while the switch 136 is set to the timer recording or playback position, the timer recording or playback instructions are automatically canceled, whereby operation by means of the timer is prohibited. As a result, the power supply of the double-deck recorder 111 can be turned off in the standby state and turned on simultaneously with the detection of a call signal. In other words, it prevents the misoperation of failing to record the caller's message because of the absence of the telephone message recording operation as the result of the on-state of the switch 136 despite the operation of switch 145.

With the above construction, the only alterations necessary to allow the ordinary double-deck recorder 111 to function as a telephone message recorder are the addition of a circuit for supplying a control signal to the terminal TEL of the double-deck control circuit 133 and the prohibition (through the forced alteration) of the predetermined operation of the double-deck control circuit 133 when this control signal is applied to the terminal. The cable 116 may be supplied as one of the control signal cables 117. Since the control signal cables 117 are used for the transmission of the remote control signal essential to the remote control of the double-deck recorder 111, the cable 116 may be supplied separately from the control signal cable 117.

In the above-described audio signal playback system including the playback device for playing back the data recorded on the first magnetic tape, the magnetic playback device equipped with the recording device for recording the playback signal from the playback device on the second magnetic tape, the amplifier for amplifying the signal from the magnetic playback, applying the amplified signal to the speaker system, amplifying the audio signal from the tuner and supplying the amplified signal to the magnetic play-back, and the adaptor for connecting the magnetic playback device to the telephone circuit, the magnetic playback device and the adaptor are connected by the first cable for transmitting the control signal and the second cable for transmitting the audio signal. The adaptor and the amplifier are connected by the third cable for transmitting the audio signal. The adaptor is equipped with the switch for causing the magnetic playback device to perform the telephone message recording operation and the switching unit for switching the second cable to the telephone circuit or the third cable. The switching unit is used to connect the second and third cables when the switch is not operated and connect the second cable to the telephone circuit when the switch is operated. When the switch is operated further, the playback device is driven so as to apply the playback signal from the first magnetic tape to the telephone circuit through the second cable and the switching unit. Then, the recording device is driven so as to cause the recording device to perform the telephone message recording operation wherein the audio signal from the telephone circuit is recorded on the second magnetic tape. The control signal is applied to the magnetic playback through the first cable during the telephone message recording operation to inhibit the magnetic playback device from performing an operation of at least one type. As a consequence, telephone message recording can be implemented simply by adding the adaptor without making full-scale alterations in the circuitry of the audio system. The present invention thus contributes to reducing malfunctions, misoperations and the like without an increase in cost.

Figure 6:
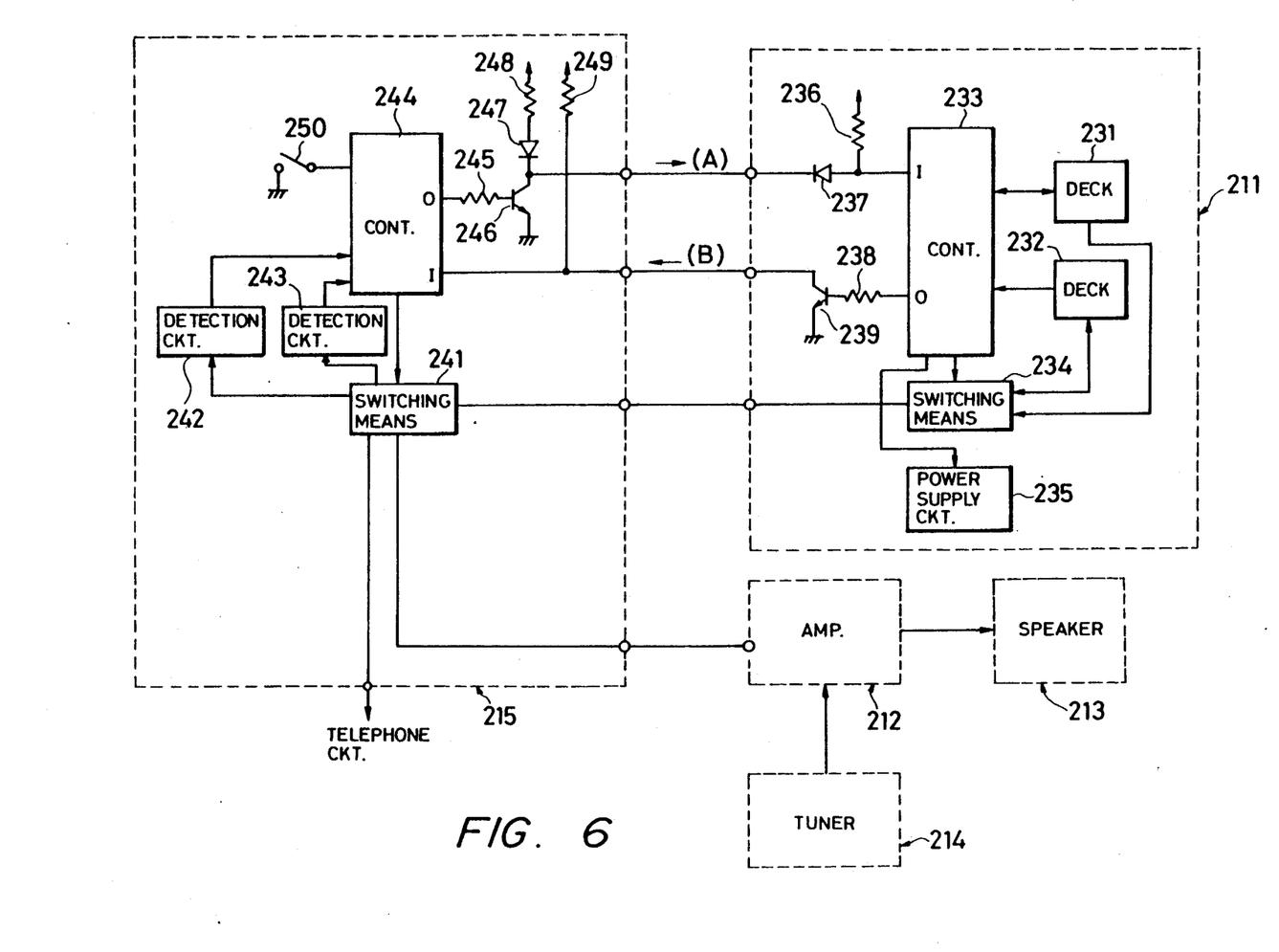
FIG. 6 is a block diagram of an apparatus for implementing a control system embodying the present invention.

FIG. 6 is a block diagram of a system for implementing the control system according to the present invention. In FIG. 6, there is shown an HF audio system including a double-deck recorder 211, an amplifier 212, a speaker system 213 and a tuner 214 (a record player or a digital audio disk player may be substituted). An adaptor 215 is added when it is required for causing the audio system to perform a telephone message recording function. The adaptor 215 applies a control signal (A) to the double-deck recorder 211, whereas the double-deck recorder 211 supplies a state signal (B) indicative of the operating state to the adaptor 215.

The double-deck recorder 211 is equipped with a deck 231 capable of at least playback and a deck 232 capable of both recording and playback. A control circuit 233 formed with a microcomputer controls the decks 231 and 232, a switching unit 234, a power supply circuit 235, etc. The playback signal of the deck 231 is supplied to the switching unit 234. Moreover, the playback and recording signals are supplied to and received from the deck 232 and the switching unit 234. A terminal I of the control circuit 233 is connected to a predetermined reference voltage supply through a resistor 236 and to the adaptor 215 through a diode 237, whereas the terminal O of the control circuit 233 is connected to the base of an npn transistor 239 with the emitter grounded.

On the other hand, the adaptor 215 has a switching unit 241. The switching unit 241 is connected to the switching unit 234 of the double-deck recorder 211, an amplifier 212 and a telephone circuit so that the connections can be switched between them. A call detection circuit 242 detects a call signal from the telephone circuit, and a marker detection circuit 243 detects a marker signal having a fixed frequency. An adaptor control circuit 244 such as a microcomputer controls various circuits. The terminal O of the adaptor control circuit 244 is connected to the base of an npn transistor 246 through a resistor 245. The emitter of the transistor 246 is grounded, whereas the collector is connected to a predetermined reference voltage supply through a diode 247 and a resistor 248. The terminal I of the adaptor control circuit 244 is connected to the predetermined reference voltage supply through a resistor 249 and to the collector of the transistor 239 of the double-deck recorder 211. A switch 250 is turned on when the telephone message recording operation is put into operation.

The output of the amplifier 212 is supplied to the speaker system 213, whereas the output of the tuner 214 is supplied to the amplifier 212.

The operation will now be described. When the HF audio system is used for normal operation but not for the implementation of the telephone message recording function, the switch 250 of the adaptor 215 is turned off.

When, for example, a copying operation is instructed in that state, the double-deck control circuit 233 controls the switching unit 234 and causes the playback signal of the deck 231 to be applied to the deck 232 as a recording signal. As power is supplied by the power supply circuit 235 controlled by the double-deck control circuit 233 and is held on, the decks 231 and 232 are thereby made operable. Accordingly, the playback signal from the magnetic tape of the deck 231 can be recorded on the magnetic tape of the deck 232.

When the switch 250 is held off, the adaptor control circuit 244 controls the switching unit 241 and connects the switching unit 234 of the double-deck recorder 211 to the amplifier 213. By selecting the function mode of the amplifier 212 for the deck the playback signal of the deck 231 or 232 is applied to the amplifier 212 and the amplified signal to the speaker system 213. Moreover, by selecting the function mode of the amplifier 213 for the tuner, the playback signal from the tuner 212 is applied to the deck 231 as a recording signal and is stored on the magnetic tape.

When the telephone message recording function is put into operation, the switch 250 of the adaptor 215 is turned on. At this time, the output of the terminal O of the control circuit 244 is inverted from high to low level for a relatively short period of time. Consequently, the low level control signal (A) is applied to the diode 237 of the double-deck recorder 211 and the diode 237 is turned on. One end of the resistor 236 is then grounded through the transistor 246 and a low level signal (pulse) is supplied to the terminal I of the double-deck control circuit 233. Then logical functions I and O are set by, e.g., varying the interval between the pulse so generated and the following pulse so as to express a given bit code signal. The adaptor control circuit 244 produces a predetermined code signal (a pulse train) when caused to perform a predetermined operation. When the given pulse train is supplied to the terminal I of the double-deck control circuit 233, the prestored program causes the double-deck control circuit 233 to perform the predetermined operation corresponding to the code and the predetermined state signal. When the double-deck receiver 211 is held on standby in a non-conductive state (however, backup power is kept being supplied to the control circuit 233), the double-deck control circuit 233 sends a low level signal on its terminal O and turns off the transistor 239. Accordingly, the high level state signal (B) is applied to the terminal I of the adaptor control circuit 244 through the resistor 249 within the adaptor 215.

Figure 7:
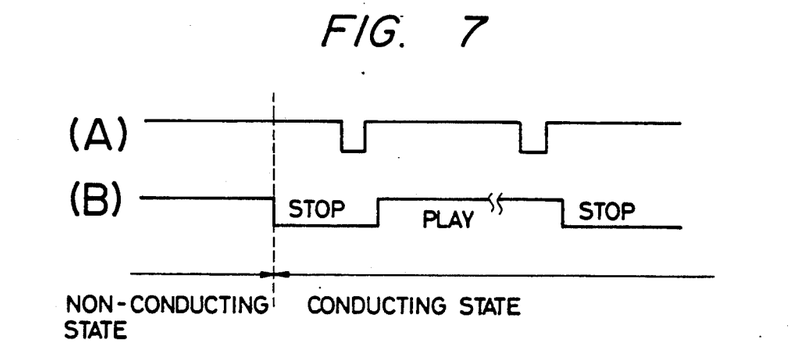
FIG. 7 is a waveform chart of the control system.
Figure 8A:
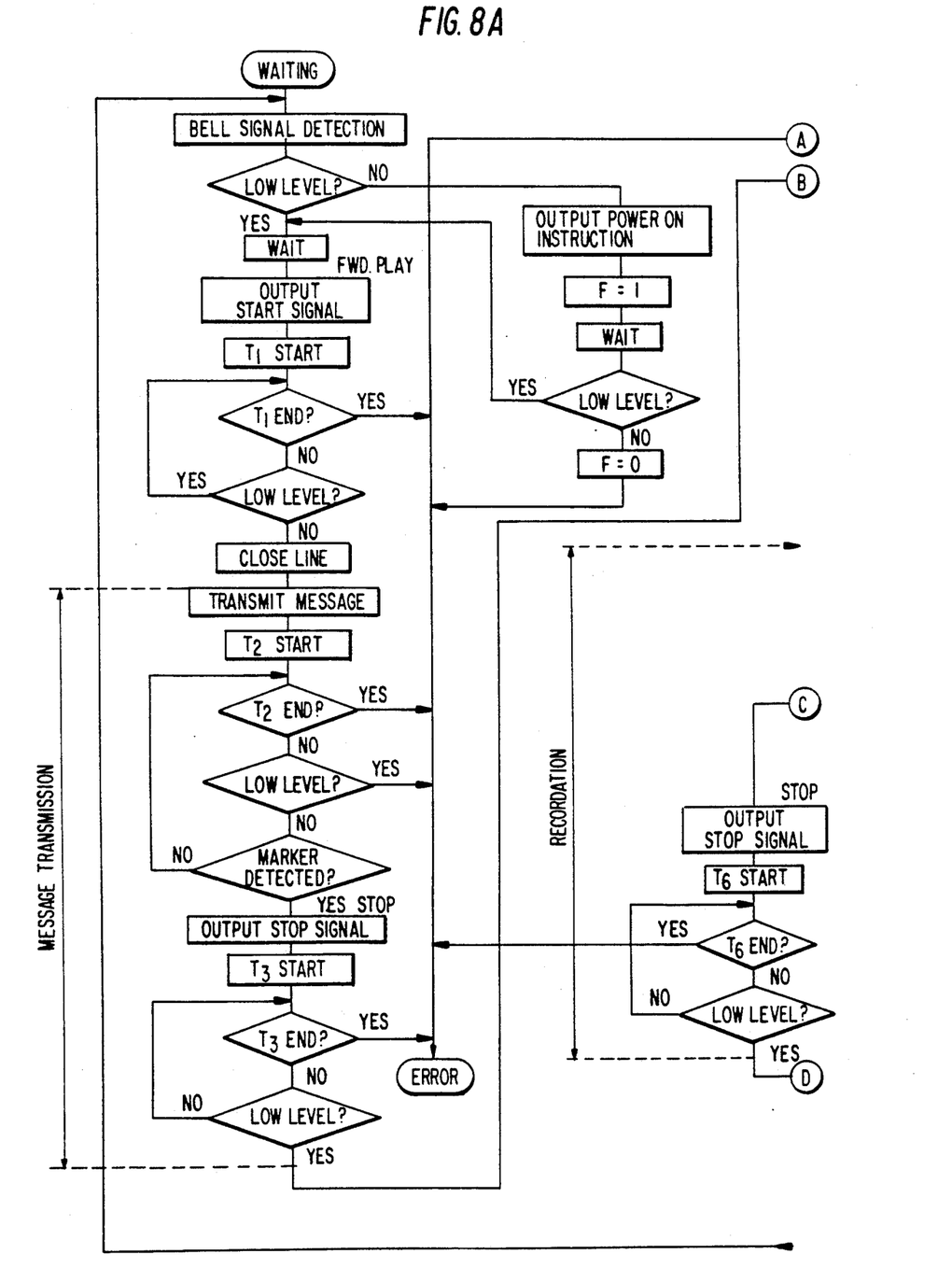
FIGS. 8A-8B are a flowchart of the control system.
Figure 8B:
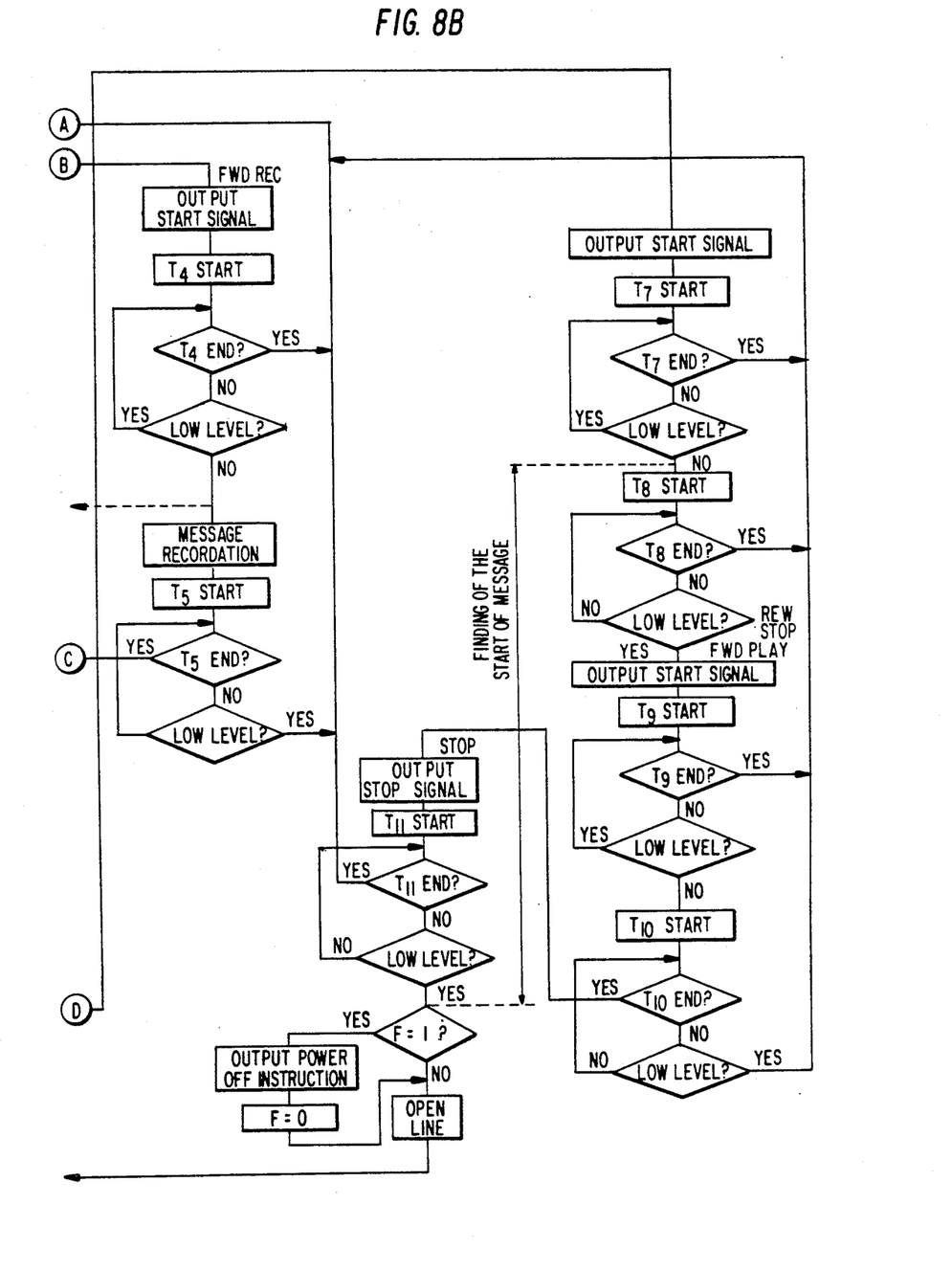

The operation in such a standby state is conducted according to a flowchart shown in FIG. 8. According to the flowchart, the adaptor control circuit 244 determines whether or not the state signal (B) from the double-deck recorder 211 is at a low level when the call signal (bell signal) is first detected by the detection circuit 242. In the control circuits 233 and 244, the low level state signal corresponds to the conductive state and non-operating (stop) state of the double-deck recorder 211, and the high level state signal corresponds to the non-conductive state and operating (play) state of the double-deck recorder 211. By conductive and non-conductive is meant that the lines connecting the control circuits 133 and 144 see a conducting or non-conducting connection on the other end. When the state signal does not remain at a low level, the adaptor control circuit 244 judges that the double-deck recorder 211 is in the non-conductive state and sends the high level pulse train out of the terminal O and the low level control signal (pulse train) to the double-deck control circuit 233 (trace (A) of FIG. 7; the code signal composed of the pulse train is shown by a pulse for the sake of convenience).

At this time, the double-deck control circuit 233 turns on the power supply circuit 235 to make the double-deck recorder 211 conduct and, by sending a high level signal on the terminal O, turns on the transistor 239. Consequently a low level state signal is applied to the terminal I of the adaptor control circuit 244 (trace (B) of FIG. 7). When the control signal is produced to make the double-deck recorder 211 conduct, the adaptor control circuit 244 causes the built-in register to set a flag (assuming F=1), and, after waiting a period of time long enough to turn on the power supply circuit 235, again determines the level of the state signal. When the state signal is not at a low level (in the conductive state), the adaptor control circuit 244 resets the flag (F=0) and deals with an error on the assumption that some trouble has occurred (e.g., it prohibits the entire telephone message recording operation thereafter or the like).

When the adaptor control circuit 244 determines that the double-deck recorder 211 is already conducting, provided that the state signal is kept at a low level when the call signal is detected, it sends the control signal on the terminal O after waiting the predetermined period of time. At this time, the double-deck control circuit 233 causes the magnetic tape of the deck 231 to travel in the forward direction and start the playback operation. It further transmits the high level signal on the terminal O so as to invert the state signal for setting it at a high level (FIG. 2(B)). On the other hand, the adaptor control circuit 244 starts the timer having a delay $T_1$. Unless the high level state signal is available within the time $T_1$, the error-processing operation is conducted. When, however, the high level state signal is obtained within the time $T_1$, the adaptor control circuit 244 closes the telephone circuit and controls the switching unit 241 so as to make the telephone circuit connect to the switching unit 234. As a consequence, the answer-back message that is prestored on the magnetic tape is sent to the telephone circuit to effect message forwarding operation.

When the message forwarding operation is started, timer operation with a delay $T_2$ is also started. The state signal and the marker signal recorded at the terminal of the answer-back message on the magnetic tape of the deck 231 are monitored during the time $T_2$. In case the state signal is inverted to the low level before the time $T_2$ elapses or the marker signal is not detected by the detection circuit 243 after the time $T_2$ elapses, error-processing is conducted. When the marker signal is detected by the marker detection circuit 243, the adaptor control circuit 244 supplies the control signal to the double-deck control circuit 233. Timer operation with a delay $T_3$ is started simultaneously and the error-processing is conducted unless the double-deck control circuit 233 stops the travel of the magnetic tape of the deck 231 within the time $T_3$ (the state signal is inverted to the low level).

When the travel of the magnetic tape of the deck 231 is stopped within the time $T_3$ and the state signal is inverted to the low level, the adaptor control circuit 244 supplies the control signal to the control circuit 233 and causes the deck 232 to transport the magnetic tape in the forward direction in the recording mode. Simultaneously with the instructions at the commencement of the travel of the magnetic tape, timer operation with a delay $T_4$ is started. Unless the magnetic tape starts traveling in the recording mode within the time $T_4$ (the state signal is inverted to the high level), error-processing is conducted. When the magnetic tape starts traveling in the recording mode within the time $T_4$ and the state signal is inverted to the high level, the adaptor control circuit 244 controls the switching unit 241 and connects the telephone circuit to the switching unit 234. Accordingly, the caller's message received through the telephone circuit is recorded on the magnetic tape of the deck 232 to achieve message recording operation.

Simultaneously with the commencement of the message recording operation, timer operation with delay $T_5$ is started. The state signal is monitored during the time $T_5$, and, when the state signal is inverted to the low level during that time, error-processing is conducted. The adaptor control circuit 244 transmits the control signal to the double-deck control circuit 233 after the time $T_5$ elapses. At this time, the double-deck control circuit 233 stops the magnetic tape of the deck 232 from traveling, releases the recording state, and inverts the state signal to the low level.

When the state signal is not inverted to the low level within the time $T_6$, error-processing is conducted. However, when the state signal is inverted to the low level within the time $T_6$ (when the recording mode is released), the control signal is sent by the adaptor control circuit 244 to the control circuit 233 and the double-deck control circuit 233 causes the deck 231 to travel in the reverse direction at high speed (rewinding). Unless the rewinding is started within the time $T_7$, error-processing is conducted. When rewinding is started within the time $T_7$ and the state signal is inverted to the high level, timer operation with a delay $T_8$ is started. Unless rewinding is terminated within the time $T_8$, error-processing is conducted.

When the magnetic tape is rewound up to the starting point within the time $T_8$ and the state signal is inverted to the low level, the control signal is sent by the adaptor control circuit 244 to the double-deck control circuit 233 and the magnetic tape of the deck 231 is caused to travel in the forward direction. Unless the travel is started within time $T_g$ error-processing is conducted.

When the travel is started within the time $T_9$ and the state signal is inverted to the high level, timer operation with a delay $T_{10}$ is started. The state signal is monitored during the $T_{10}$ and, when the state signal is inverted to the low level, error-processing is conducted.

The control signal is sent by the adaptor control circuit 244 to the control circuit 233 when the time $T_{10}$ has elapsed and the travel of the magnetic tape of the deck 231 is stopped. Since the time $T_{10}$ is made to correspond to the interval from the starting point of the magnetic tape to that of the answer-back message, the starting point of the answer-back message, the starting point of the answer-back message can be set in position. When the magnetic tape does not stop within the time $T_{11}$ after the output of the stop signal, error-processing is conducted.

When the flag is not set (F=0), the power supply circuit 235 is already in the on state at the time of call signal detection and therefore the telephone circuit is opened and made to remain on standby without turning off the power supply circuit 235. In so doing, the power supply circuit 235 of the double-deck recorder 211 is directly controlled by the adaptor 215. However, it is advantageous to control the power supply of the deck 211 indirectly by supplying power to the double-deck recorder 211 from the amplifier 212 and controlling the supply of power to the amplifier 212 by the adaptor 215. In other words, the telephone message recording operation can be implemented without impairing the play-back by means of the tuner when the play-back signal is applied by the tuner 214 to the speaker system 213 through the amplifier 212.

When the switch 250 is turned on by mistake while the double-deck recorder 211 is being used (e.g., during a copying operation), the call signal is detected, and, when the control signal is produced, the state signal is kept at the high level (which means during operation or the non-conductive state) since the decks 231 and 232 are being operated. Accordingly, the control signal for turning on the power supply is sent by the adaptor control circuit 244 to the double-deck control circuit 233. Although the register is set then, the operation of the power supply circuit 235 kept in the on state is free from change, and accordingly the state signal is not inverted to the low level. Consequently, the register is reset and the error-processing is conducted, so that the telephone message recording operation is not effected.

Although an example of controlling the operation of the double-deck recorder 211 by means of the adaptor 215 has been described, the components for carrying out the various operations described are not limited to those mentioned above. The present invention is, needless to say, applicable to cases where an audio-visual system is controlled by a remote control device and where home electronic equipment is controlled by making use of the telephone circuit. Moreover, the control or state signal may be sent and received via wireless transmission.

In the control system for controlling the first apparatus performing the predetermined operation by causing the first apparatus to send the state signal relating to the operating state thereof to the second apparatus and the second apparatus to send the control signal to the first apparatus according to the present invention, the state signal is composed of the first level signal and the second level signal, the second level being different from the first level. The non-conductive state of the first apparatus is made to correspond to the first level, whereas the conductive state of the first apparatus is made to correspond to the second level. Moreover, the operating state of the first apparatus is made to correspond to the first level, whereas the non-operating state of the first apparatus is made to correspond to the second level. Accordingly, numerous state signals (codes) are not required for making the first apparatus perform various sorts of operations while checking the operating state thereof, so that the operation of the first apparatus becomes controllable with simple and inexpensive components. The telephone message recording function can be realized without substantially changing the construction of the audio system of the double-deck recorder, the amplifier, the speaker system, etc.; it is only necessary to add the adaptor thereto.

What is claimed is:

1. A telephone message system, comprising:
   bell signal receiving means for receiving a bell signal from a telephone circuit;
   control signal output means for producing a control signal in response to said bell signal receiving means;
   a television receiver;
   video signal supply means for supplying a video signal to said television receiver;
   memory means for storing data notifying an incoming call; and
   means for superimposing the data stored in said memory means on said video signal in response to said control signal;
   a magnetic playback device comprising at least one mechanism capable of playback and at least one other mechanism capable of recording;
   an amplifier to which said television receiver and a speaker system are connected; and
   an adaptor connected to said telephone circuit, to said magnetic playback device, and to said amplifier through control signal lines and audio signal lines, wherein said adaptor comprises control means for replying a message tape on said magnetic playback device responsive to a bell signal detection output from said bell signal detecting circuit and for recording a caller's remarks on said magnetic playback device, and control means for displaying predetermined characters responsive to said bell signal detection output.

2. A telephone message recording system, comprising:
   a magnetic playback device comprising at least one mechanism capable of playback and at least one other mechanism capable of recording;
   an amplifier to which a television and a speaker system are connected; and
   an adaptor connected to a telephone circuit, to said magnetic playback device and to said amplifier through control signal lines and audio signal lines wherein said adaptor comprises control means for replying a message tape on said magnetic playback responsive to a bell signal detection output from a telephone circuit and for recording a caller's remarks on said magnetic playback device, and control means for displaying predetermined characters responsive to said bell signal detection output from said telephone circuit.

* * * * *